US006951213B2

(12) United States Patent
Coleman et al.

(10) Patent No.: US 6,951,213 B2
(45) Date of Patent: Oct. 4, 2005

(54) PORTABLE BARBECUE GRILL

(75) Inventors: Brian Coleman, Columbus, GA (US); John McNair, Tai Po (HK); Bruce Morgan, Sheung Shui (HK); Harry J. Sharples, Tsuen Wan (HK); Fung Chi Kin, Tuen Mun (HK)

(73) Assignee: W.C. Bradley Company, Columbus, GA (US)

( * ) Notice: Subject to any disclaimer, the term of this patent is extended or adjusted under 35 U.S.C. 154(b) by 271 days.

(21) Appl. No.: 09/927,106

(22) Filed: Aug. 10, 2001

(65) Prior Publication Data

US 2002/0020405 A1 Feb. 21, 2002

Related U.S. Application Data (60) Provisional application No. 60/224,821, filed on Aug. 11, 2000.

(51) Int. Cl.[7] ................................................. F24C 5/20
(52) U.S. Cl. ........................ 126/38; 126/41 R; 126/50; 126/39 R
(58) Field of Search ................... 126/40, 50, 25 R, 126/41 R, 39 R, 38, 305, 306, 304 R, 304 A, 39 H, 39 N, 39 J; 99/446, 445, 444

(56) References Cited

U.S. PATENT DOCUMENTS

| | | | | |
|---|---|---|---|---|
| 541,534 A | * | 6/1895 | Haffcke | 99/446 |
| 1,040,451 A | * | 10/1912 | Stockton | 126/25 R |
| 1,130,747 A | * | 3/1915 | Lozano | 431/278 |
| 1,159,890 A | * | 11/1915 | Best et al. | 99/446 |
| 1,419,835 A | * | 6/1922 | Ferck | 248/188.4 |
| 1,548,185 A | * | 8/1925 | Carr | 126/40 |
| 1,582,346 A | * | 4/1926 | Oster | 312/236 |
| 2,244,145 A | * | 6/1941 | Erickson | 99/337 |
| 2,787,995 A | * | 4/1957 | Alter | 126/25 R |
| 2,852,016 A | * | 9/1958 | Weatherwax | 126/9 R |
| 2,879,708 A | * | 3/1959 | Cripe | 99/342 |
| 2,985,164 A | * | 5/1961 | Imoto | 126/25 R |
| 3,098,477 A | * | 7/1963 | Lotter | 126/41 R |
| 3,230,948 A | * | 1/1966 | Schmitt | 126/25 R |
| 3,418,921 A | * | 12/1968 | Fautz | 99/445 |
| 3,422,746 A | * | 1/1969 | Sheinker | 99/445 |
| 3,463,139 A | * | 8/1969 | Hayashi et al. | 126/39 J |
| 3,498,284 A | * | 3/1970 | Swaddey | 126/41 R |
| 3,938,494 A | * | 2/1976 | Clark | 126/41 R |
| 4,125,109 A | * | 11/1978 | Erwin | 126/681 |
| 4,131,261 A | * | 12/1978 | Shy | 248/439 |
| 4,245,505 A | * | 1/1981 | Baynes | 73/296 |
| 4,337,751 A | * | 7/1982 | Sampson et al. | 126/25 R |
| 4,627,408 A | * | 12/1986 | Schlosser | 126/41 R |
| 4,677,964 A | * | 7/1987 | Lohmeyer et al. | 126/41 R |
| 4,741,321 A | * | 5/1988 | Squires | 126/9 R |
| RE32,754 E | * | 9/1988 | Hahn | 126/25 R |
| 4,781,170 A | * | 11/1988 | Perl | 126/39 E |
| 4,787,364 A | * | 11/1988 | Zepeda | 126/41 R |
| 4,829,978 A | * | 5/1989 | Schlosser | 126/41 R |
| 4,886,045 A | * | 12/1989 | Ducate et al. | 126/41 R |
| 4,949,701 A | * | 8/1990 | Krosp et al. | 126/41 R |
| 5,065,734 A | * | 11/1991 | Elliott | 126/9 R |
| 5,090,398 A | * | 2/1992 | Raymer et al. | 126/41 R |

(Continued)

Primary Examiner—Carl D. Price
(74) Attorney, Agent, or Firm—Thomas, Kayden, Horstemeyer & Risley, LLP (57) ABSTRACT

A portable gas cooking grill apparatus comprising a grill having a hood and a firebox. It is preferable that the hood can be received by and seated upon the firebox, thereby enclosing the grill. A burner assembly, capable of heating the interior portion of the grill, is preferably disposed underneath a substantially solid cooking surface and within the grill, thereby fully enclosing the burner assembly. The grill is supported by a frame, arranged and configured to substantially correspond to the firebox and releasably receive the grill thereon. The frame includes a leg assembly extending therefrom. The leg assembly is fixed to the frame such that the leg assembly is movable between a retracted position and an extended position.

3 Claims, 6 Drawing Sheets

| | | | | |
|---|---|---|---|---|
| D326,207 S | * | 5/1992 | Koziol | D7/332 |
| 5,117,747 A | * | 6/1992 | Kuechler | 99/400 |
| 5,186,159 A | * | 2/1993 | Crow et al. | 126/41 R |
| 5,333,596 A | * | 8/1994 | Clifford | 126/41 R |
| 5,421,319 A | * | 6/1995 | Moore et al. | 126/41 R |
| 5,505,190 A | * | 4/1996 | Kalenian | 126/41 R |
| D377,735 S | * | 2/1997 | Craven | D7/406 |
| 5,699,784 A | * | 12/1997 | Tippmann et al. | 126/33 |
| 5,791,331 A | * | 8/1998 | Stewart | 126/41 R |
| 5,799,645 A | * | 9/1998 | Strader et al. | 126/39 R |
| D413,229 S | * | 8/1999 | Hopkins et al. | D7/406 |
| 5,934,184 A | * | 8/1999 | Schlosser et al. | 99/385 |
| 6,131,562 A | * | 10/2000 | Schlosser et al. | 126/41 R |
| 6,142,140 A | * | 11/2000 | Shumaker | 126/9 B |
| 6,257,229 B1 | * | 7/2001 | Stewart et al. | 126/276 |
| 6,314,871 B1 | * | 11/2001 | Holbrook et al. | 99/401 |
| 6,324,998 B1 | * | 12/2001 | Alden et al. | 108/90 |
| 6,422,230 B1 | * | 7/2002 | Stewart et al. | 126/25 R |

* cited by examiner

PORTABLE BARBECUE GRILL

CLAIM OF PRIORITY

This application claims priority to copending U.S. provisional application entitled, "Portable Barbecue Grill," having Ser. No. 60/224,821, filed Aug. 11, 2000, which is entirely incorporated herein by reference.

TECHNICAL FIELD

The present invention is generally related to gas cooking grills and, more particularly, is related to a portable gas cooking grill apparatus, having the mobility of a portable grill and the cooking capabilities of a full size gas grill.

BACKGROUND OF THE INVENTION

Gas fired barbecue grills continue to increase in popularity due to their convenience of operation, relatively instant availability for use in cooking, substantially even heat distribution and cooking of food, ease of clean-up and versatility to cook numerous varieties of foods. Gas grills typically include a metal grid as a cooking surface and use porous lava rocks disposed beneath the cooking grid to radiate heat upward to the cooking surface. This configuration allows grease and juices released from the cooking food to drip through the cooking grid and onto the lava rocks, eventually resulting in grease accumulation and flame flare-ups, or uncontrollable flames. Metal bars or metal grates may also be placed beneath the cooking surface in an attempt to collect and vaporize grease and other drippings. While this may be partially successful, unvaporized grease must still be dealt with, typically through an evacuation hole or through draining the grease into a hanging can or grease cup.

Furthermore, such cooking grids are limited in use. Cooking that requires a planar surface, such as frying, requires a user to place an additional cooking tool such as a pan on top of the cooking grid. Additionally, smaller food items, such as vegetables, must be placed in an additional container, such as a basket or wrapped in foil or the like, to prevent those smaller food items products from falling through the cooking grid and onto the lava rocks.

Although it is common for full size gas grills to be located on a movable cart with the grill body centrally located toward the top center of the cart at approximately waist height, the mobility of these gas grills is somewhat limited. This arrangement places the predominant weight of the grill on top of the cart, resulting in a somewhat top-heavy and unstable configuration. Furthermore, the mobility of these grills is limited due to the weight and cumbersomeness of the cart assembly and the grill, commonly fixedly attached to each other. These designs result in gas grills on carts that do allow for movement of the grill within a relatively limited area, such as a deck or patio.

An additional drawback of such grills is that they typically require assembly by the purchaser. Often, multiple tools and several hours of labor are required to construct the grill and cart assembly. The purchaser must also follow lengthy and sometimes complicated instructions in order to complete the assembly of these grills.

While smaller, more readily portable grills are also popular for tailgating, camping, and even for use in residences with limited space, such as apartments, these grills are typically small in size and often heated by charcoal. Although these grills are small and intended to be portable, the charcoal burning grills require a user to also transport charcoal, lighter fluid, and matches. Charcoal not only requires the transport of items additional to the grill, but charcoal is slower than gas to heat up, is messy to clean up and requires substantial cooling off time before packing up.

These smaller sized, portable grills are also made in a gas-cooking configuration. However, portable gas grills are also beset with their own set of problems. Similar to the portable charcoal grills described above, portable gas grills are often small in size, resulting in insufficient size cooking surfaces, messy accumulation of draining juices and grease, and may be difficult to level in order to provide a flat cooking surface. Furthermore, portable grills are typically restricted to relatively shorter cooking times due to a limited supply of heat source, either a limited gas supply or a limited capacity to hold charcoal.

Thus, a heretofore unaddressed need exists in the industry to address the aforementioned deficiencies and inadequacies.

SUMMARY OF THE INVENTION

The present invention is a portable gas grill cooking apparatus. Briefly described, in architecture, the apparatus comprises a grill having a hood and a firebox which are preferably steel stampings that provide an extremely durable, yet lightweight structure. It is to be understood; however, that other materials, such as cast aluminum could also be used. It is preferable that the hood be received by and seated upon the firebox, thereby enclosing the grill. A burner assembly, capable of heating the interior portion of the grill is preferably disposed underneath a substantially solid cooking surface and within the grill. A frame, arranged and configured to correspond substantially to an exterior portion of the firebox, releasably receives and supports the grill. The frame includes a leg assembly extending therefrom. The leg assembly is preferably fixed to the frame such that the leg assembly is movable between a retracted position and an extended position. It is preferable that the grill is easily removed from the frame and the leg assembly easily moved to the retracted position for portability and storability.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
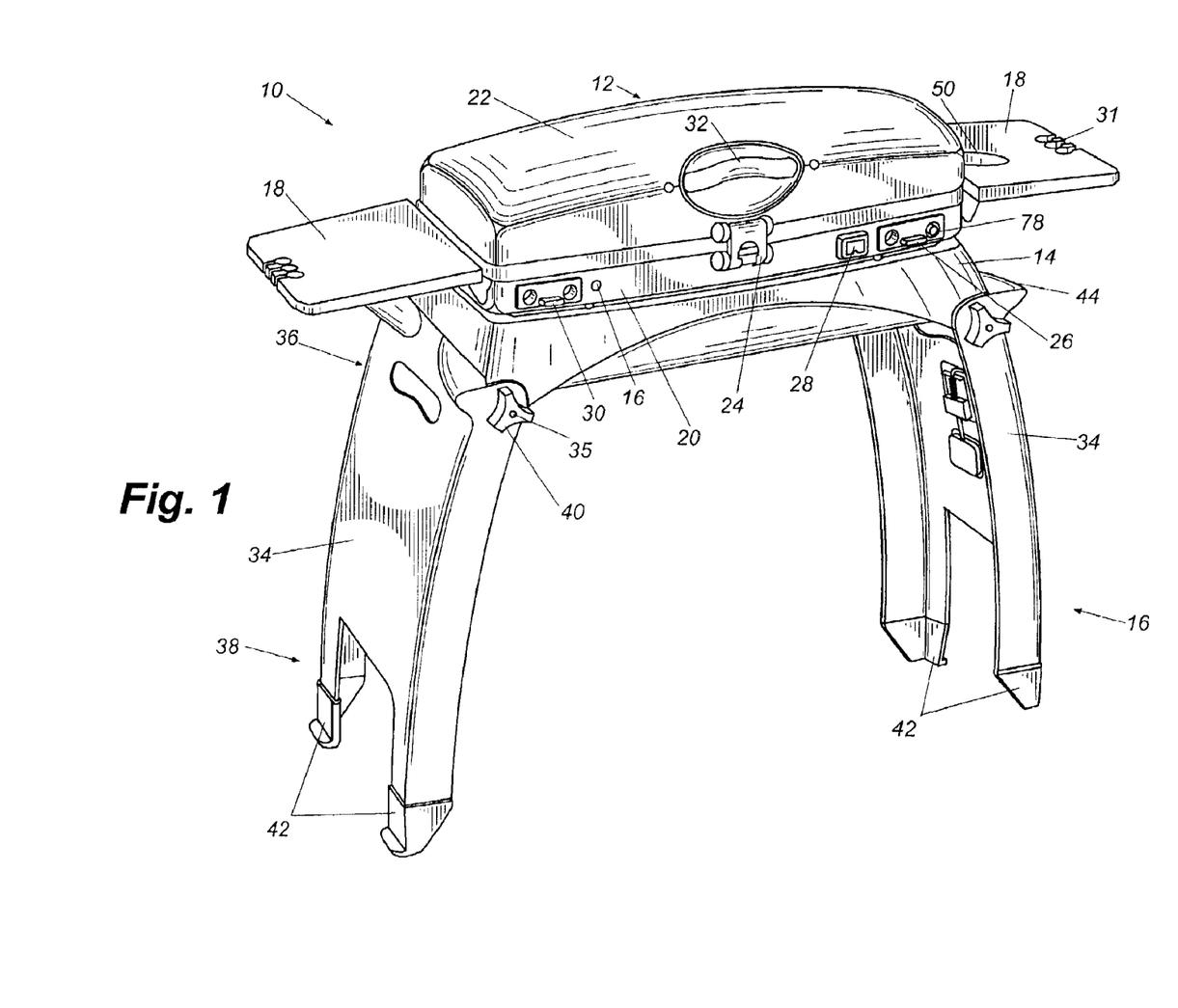
FIG. 1 is a perspective view of the portable grill apparatus of the present invention.

FIG. 1 illustrates the portable grill apparatus 10 of the present invention as arranged for use in a full height configuration. Generally, the grill apparatus 10 of the present invention comprises a grill 12, a frame 14, and a leg assembly 16. The grill apparatus 10 may also include a preferable but optional side shelf 18 to provide extra room for preparation and placement of food or placement of cooking tools and utensils. The grill 12 preferably comprises aluminized steel, while the frame 14 and leg assembly 16 preferably comprise a heat resistant composite material. It is preferred that the optional side shelf 18 comprises a lightweight, heat-resistant material.

More specifically, the grill 12 of the preferred embodiment comprises a firebox 20 arranged and configured to receive a hood 22. The grill 12 preferably includes various gauges (26, 28, 30) viewable and accessible from the exterior of the grill 12 when the hood 22 is seated on the firebox 20. Preferred gauges include, but are not limited to, a grill level indicator 26, a temperature level indicator 28 and a grease level indicator 30. Although as illustrated, the above-mentioned gauges are positioned on a front face of the firebox 20 of the grill 12, it should be understood that these gauges can be located at various positions about the grill apparatus 10 and remain within the spirit of the present invention.

The grill apparatus 10 preferably comprises at least one or a pair of the optional side shelves 18. In a preferred embodiment at least one of the side shelves 18 includes at least one receiving aperture 31. The receiving aperture can be arranged and configured to releasably receive typically used grilling tools, such as a spatula, tongs, or the like (not shown). The side shelf 18 can also comprise a fuel aperture 50 disposed therein to provide a user access to a fuel source 46 (FIG. 2) while keeping the fuel source 46 out of the way of the user. The side shelf 18 preferably comprises a substantially planar member having a thickness and a pair of prongs 51 (FIGS. 2 and 4) extending therefrom. The prongs 51 are arranged and configured to be releasably received by a portion of the grill 12, such as a receiving end 82 (FIG. 8) of a support member 80 disposed within the firebox 20 of the grill 12.

The hood 22 can be releasably fixed to the firebox 20 with a locking latch 24 which may be mounted on either the hood 22 or on the firebox 20. The grill 12 also preferably includes a handle 32 whereby the grill 12 can be easily carried when the locking latch 24 is in a locked position. In the configuration illustrated, the handle 32 can also be used to raise the hood 22 from its seated position on the firebox 20. The handle 32 is illustrated as disposed toward a front and top face of the hood 22 of the grill 12; however, it should be understood that the grill handle 32 can be located in various positions about the grill apparatus 10.

The frame 14 preferably includes a leg assembly 16 extending therefrom and is arranged and configured to releasably receive the firebox 20 of the grill 12. The leg assembly 16 is preferably capable of being arranged in either an extended position (FIG. 1) or retracted position (FIGS. 5 and 6) and comprises at least a pair of leg members 34, each leg member 34 having a proximal end 36 and a distal end 38. Each leg member 34 can be connected to the frame 14 with a pivotal connection 35 toward the proximal end 36 of the leg member 34. The distal end 38 of each leg member 34 is preferably movable about the pivotal connection 35 and can be locked into a desired position with a locking mechanism 40. In the extended position, as illustrated in FIG. 1, the distal end 38 of each leg member 34 is extended away from the frame 14. A preferred locking mechanism 40 can be tightened to keep the leg members 34 in position. In this configuration, the grill 12 is elevated to approximately waist height of a user and can be reached without bending or kneeling. In the retracted position (FIGS. 5 and 6), the distal end 38 of each leg member 34 is disposed toward the frame 14 and is substantially adjacent the proximal end 36 of the opposite leg member 34. Again, the locking mechanism 40 can be tightened to keep the leg members 34 in retracted position. One type of locking mechanism 40 that can be implemented is a friction screw-type fastener that can be tightened or loosened to facilitate movement of the leg member 34.

Each leg member 34 preferably comprises a pair of standing supports 42 opposite each other and extending from the distal end 38 of each leg member 34. It is preferable that each leg member 34 is substantially solid to provide a sturdy support for the grill 12 and for durability. Each leg member 34 also comprises a flange support 44 disposed toward its proximal end 36. Each standing support 42 preferably contacts the surface upon which the grill 10 is set up for use, such as the ground, when the leg members 34 are in the extended position (FIG. 1). The standing supports 42 are preferably arranged and configured to dig into soft surfaces as necessary, in order to level the grill 10, as further described hereinafter. In the alternative, the grill apparatus 10 can also comprise a leveling block 41, shown in FIG. 2, to aid in leveling the grill apparatus 10. A preferred leveling block 41 includes a continuously level substantially planar surface 43 and a multiple level surface 45. The multiple level surface 45 preferably includes a substantially planar raised portion 47 and a substantially recessed portion 49. In use, the substantially planar surface 43 contacts the surface upon which the grill apparatus 10 will be used. The recessed portion 49 of the multiple level surface 45 releasably receives the standing support 42 of the leg member 34. It is preferable that the apparatus 10 includes as many leveling blocks 41 as necessary to level the apparatus, as discussed hereinafter.

Figure 5:
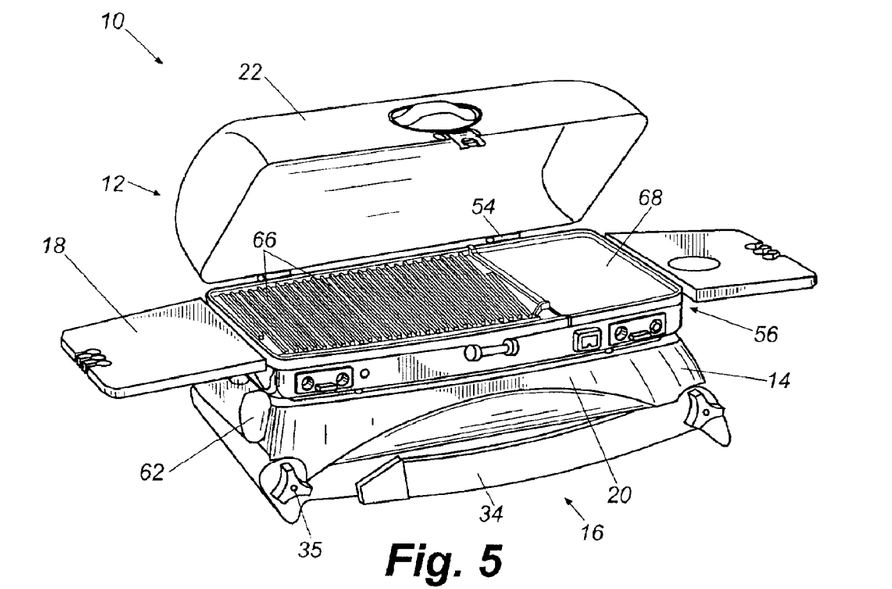
FIG. 5 is a perspective view of the leg assembly in a second position and a first preferred cooking surface configuration disposed in an interior portion of the grill apparatus of FIG. 1.

The preferred flange support 44 is arranged and configured to contact a surface upon which the grill 10 is assembled for use when the leg members 34 are pivoted upward in the retracted position (FIG. 5). In this configuration, the grill apparatus 10 is compact and can be placed upon any surface for use such as a table top or the tailgate of a station wagon, pickup truck or sport utility vehicle. The retracted position also facilitates portability and easy storage of the frame 14 and leg assembly 16.

Figure 3:
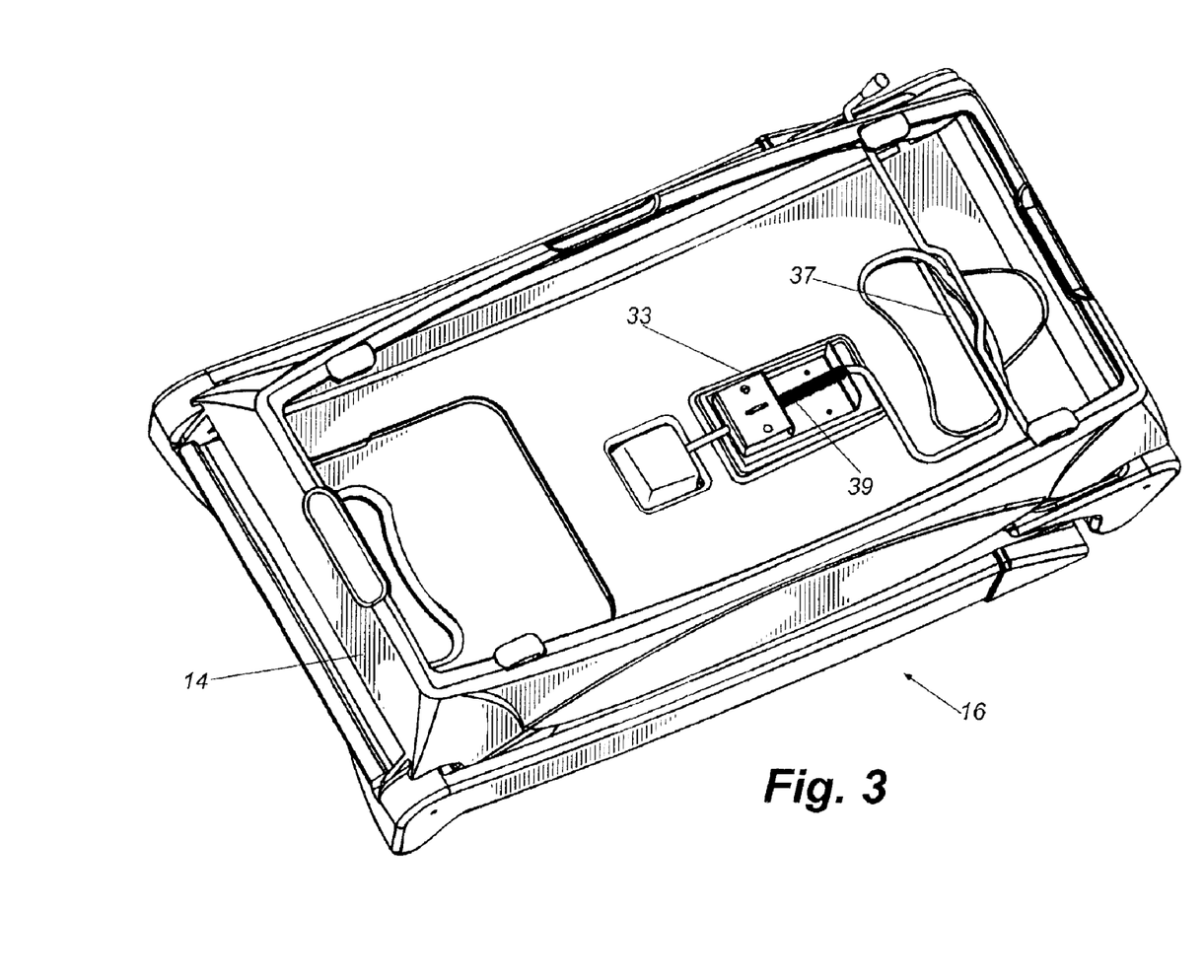
FIG. 3 is a perspective view of a leg member latch disposed on a leg assembly of the grill apparatus illustrated in FIG. 1.

The leg assembly 16 can also include a leg member latch 33, as illustrated in FIG. 3, for locking the pair of leg members 34 in the retracted position. The leg member latch 33 is preferably easily movable between a latching and unlatching position and can be spring loaded, or the like, for easier movement therebetween. The optional leg member latch 33 can be disposed on an inner surface of a leg member 34 and can comprise a hook (not shown) arranged and configured to engage a loop (not shown) disposed on an internal surface of an opposing leg member 34. The hook engages the loop to releasably fix the leg assembly 16 in the retracted position (FIG. 3). To easily move the leg assembly to the extended position, a user can slide a release lever 37. It is preferable that the release lever 37 is disposed substantially adjacent the leg assembly handle 52 for easy access by the user with one hand. The release lever 37 is connected by a spring 39 to the hook (not shown), and, when manipulated, disengages the hook from the loop and releases the leg members 34 from their nested position. Similarly, when fixing the leg member assembly 16 in the retracted position, the leg members 34 are moved into the proper position and a user can slide the release lever 37 away from the leg member latch 33 until the hook and loop are substantially in alignment. The hook and loop can be engaged by the user then releasing the leg member lever 37.

Figure 2:
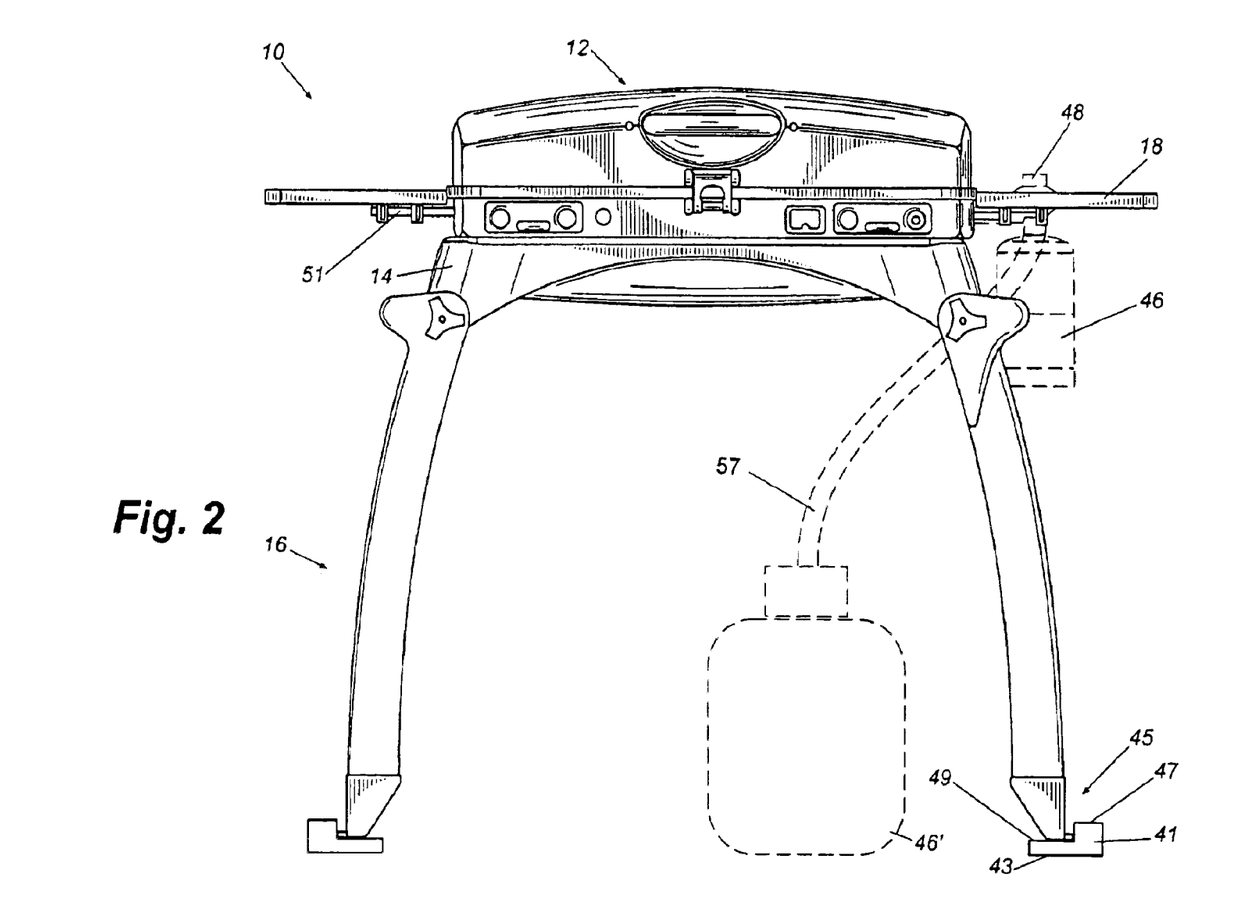
FIG. 2 is a front view of portable grill apparatus illustrated in FIG. 1, including optional fuel sources, shown in dashed lines.

The grill 10, in a preferred embodiment, is fueled by gas, such as propane. Common propane tanks on the market today come in various sizes, of which the grill 10 is capable of accommodating, as illustrated in FIG. 2. In one configuration, the heat source of the grill 10 (illustrated in FIG. 8 and discussed in detail hereinafter) can be fueled by a fuel source 46, such as a 1-pound LP tank. In another embodiment, a fuel source 46' comprising a 20-pound LP tank can be used to fuel the heat source 46. In this configuration, it is preferable that a connection hose 57 is used as a conduit between the fuel source 46 and the grill itself 10. Both fuel sources 46, 46' can be interchangeably received by a quick connect-valve 48 extending from the grill 12. It is preferable that the quick-connect valve 48 is accessible from the exterior of the grill 12. It is further preferable that the quick-connect valve 48 is easily accessible by a user but that the fuel source 46 is out of the way. A fuel aperture 50 disposed in a side shelf 18 (FIG. 1) makes this preferred arrangement possible.

Figure 4:
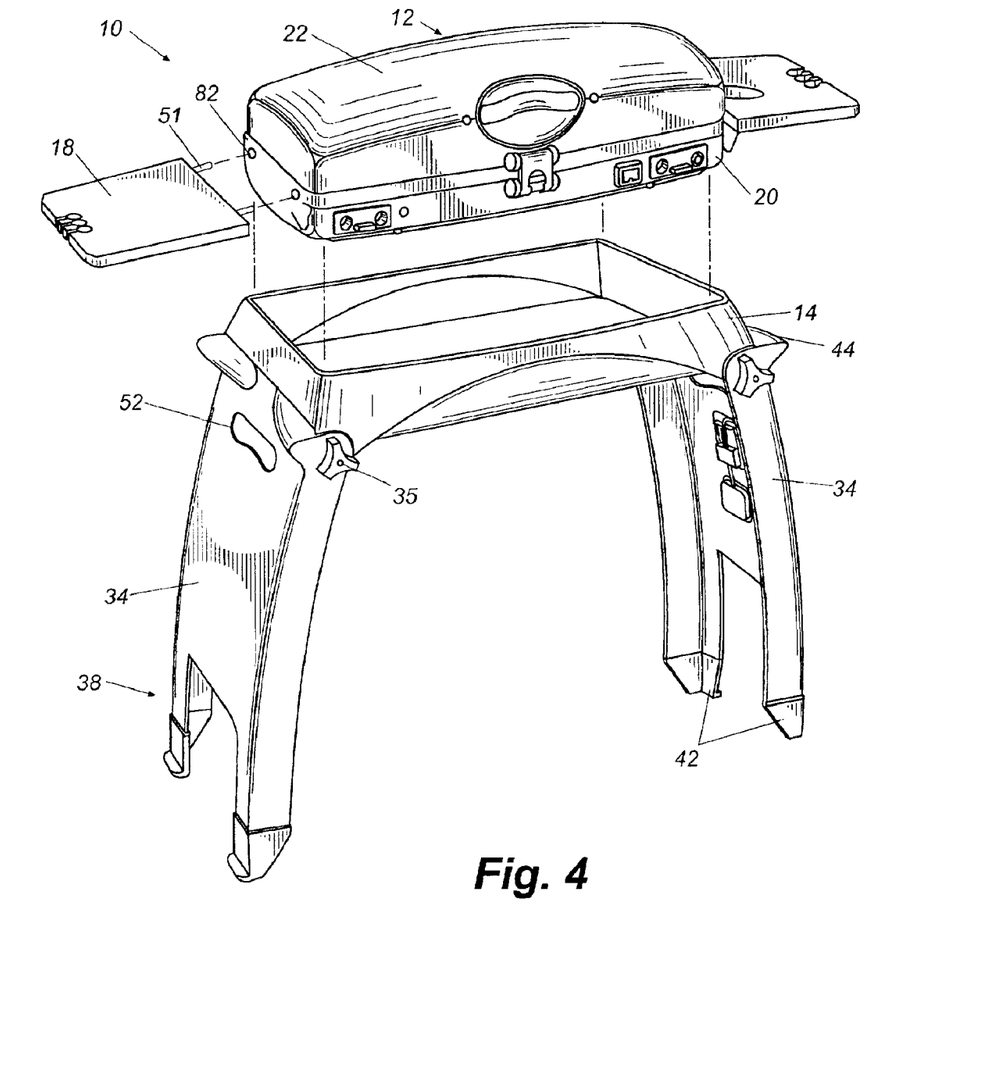
FIG. 4 is a perspective view illustrating the assembly and disassembly of the portable grill apparatus illustrated in FIG. 1.

Turning next to FIG. 4, it can be seen that the grill apparatus 10 as illustrated in FIGS. 1 and 2 is easily assembled and disassembled as shown, resulting in a grill 10 that is easily portable and storable in limited space. As shown in FIG. 4, the grill 12 can be removed from the frame 14 and the side shelves 18 can be removed from the grill 12, rendering the grill 12 an easily handled, substantially rectangular shape. The side shelves 18, when removed from the exterior of the grill 12, can be stored in the grill 12 or on the frame 14 or leg assembly 16 for portability and storage. It is preferable that the grill 12 is merely seated within the frame 14 to make assembly and disassembly quick and easy. With the firebox 20 and hood 22 closed together and the locking latch 24 locked, the grill 12 can be carried with one hand by the handle 32 disposed thereon. As can now be seen, it is preferable that the frame 14 is substantially hollow, thereby allowing air to circulate underneath the grill 12. As described above, the leg assembly 16 can be disposed in a retracted position (as illustrated in FIG. 5) and releasably fixed into position with the locking mechanism 40. In this configuration, a leg assembly handle 52, disposed in at least one of the preferred pair of leg members 34, can be used to grasp and carry the frame 14/leg assembly 16 combination with one hand. As such, the entire grill apparatus 10 can be carried in one trip by one user with the grill 12 in one hand and the frame 14/leg assembly 16 in the other.

FIGS. 5–8 illustrate preferred features interior to the grill 12. As seen in FIG. 5, it is preferable that the hood 22 is hingedly connected 54 to the firebox 20. As such, when the hood 22 is "removed" from the firebox 20, the grill 12 opens in a clamshell-like manner. The hinged connections 54 are preferably spring steel type hinges which hold the grill 12 open for cooking when the hood 22 is rotated beyond a predetermined point. Internal to the grill 12, it is preferable that the firebox 20 supports a cooking surface 56 therein. It is preferred that the cooking surface 56 is supported in the bottom 20 at an angle such that a drainage aperture 60 disposed in the cooking surface 56 is located at the lowest point thereof. It is preferable that an external grease trap 62 is in fluid communication with the drainage aperture 60, thereby receiving and containing juices and grease channeled away from the cooking food and into the drainage aperture 60. A cover 61 for the aperture of the grease trap is attached thereto, in any suitable manner, for covering the aperture when the grill is not in use, to prevent the ingress of rain, insects, etc. Alternatively, the juices and grease can be channeled through the drainage aperture 60 to an internal grease trap 64 (shown in FIG. 8).

Figure 6:
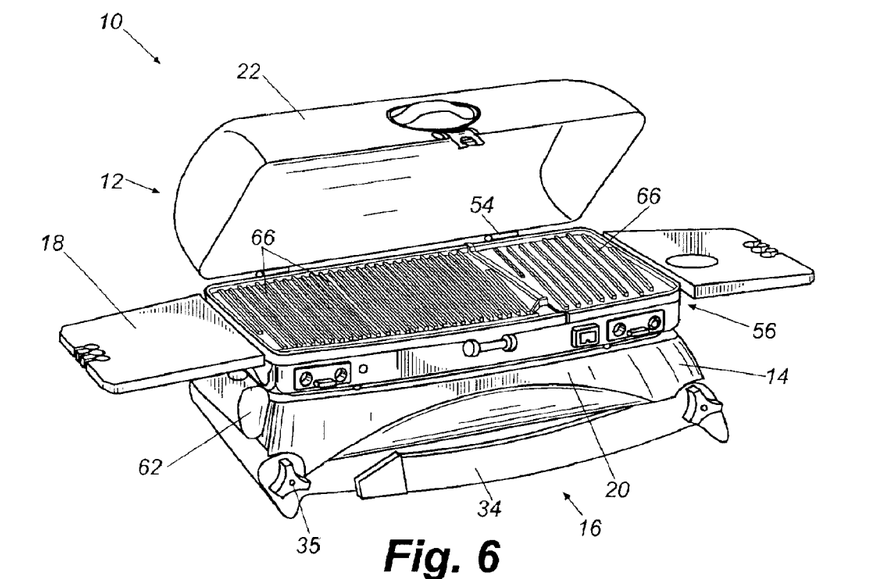
FIG. 6 is a perspective view of the leg assembly in a second position and a second preferred cooking surface configuration disposed in an interior portion of the grill apparatus of FIG. 1.

Focusing on the cooking surface 56, FIGS. 5 and 6 illustrate various embodiments thereof. Looking first at FIG. 5, the cooking surface 56 comprises a sear portion 66 and a griddle portion 68. Although the sear portion 66 is illustrated as comprising a larger surface area of the cooking surface 56 than the griddle portion 68, it should be understood that the various cooking surface 56 configurations illustrated and discussed herein can comprise any portion of the cooking surface 56 without departing from the spirit of the present invention. Alternatively, and as illustrated in FIG. 6, the cooking surface 56 can comprise entirely a sear portion 66. In another embodiment (not shown), the cooking surface 56 can comprise entirely a griddle portion 68. The combinations of sear portions 66 and griddle portions 68 can be interchangeable by either removing portions and replacing them with other portions or simply by flipping each portion over to reveal the another cooking surface configuration on the opposite side.

Figure 7:
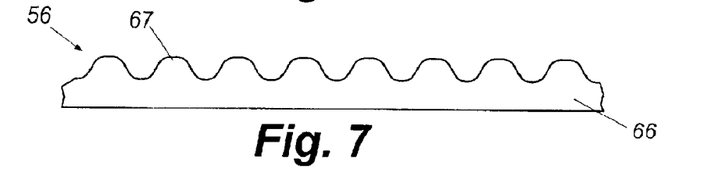
FIG. 7 is a cross-sectional planar view of a preferred cooking surface disposed in an interior portion of the grill apparatus of FIG. 1.

FIG. 7 illustrates a cross section of the preferred sear portion 66. As can be seen, the sear portion 66 is preferably solid, having a corrugated upper cooking surface 67. The preferred sear portion 66 traps all juices and grease released from cooking food thereby preventing those juices and grease from dropping beneath the cooking surface 56 onto a gas burner assembly 70 disposed below.

Figure 8:
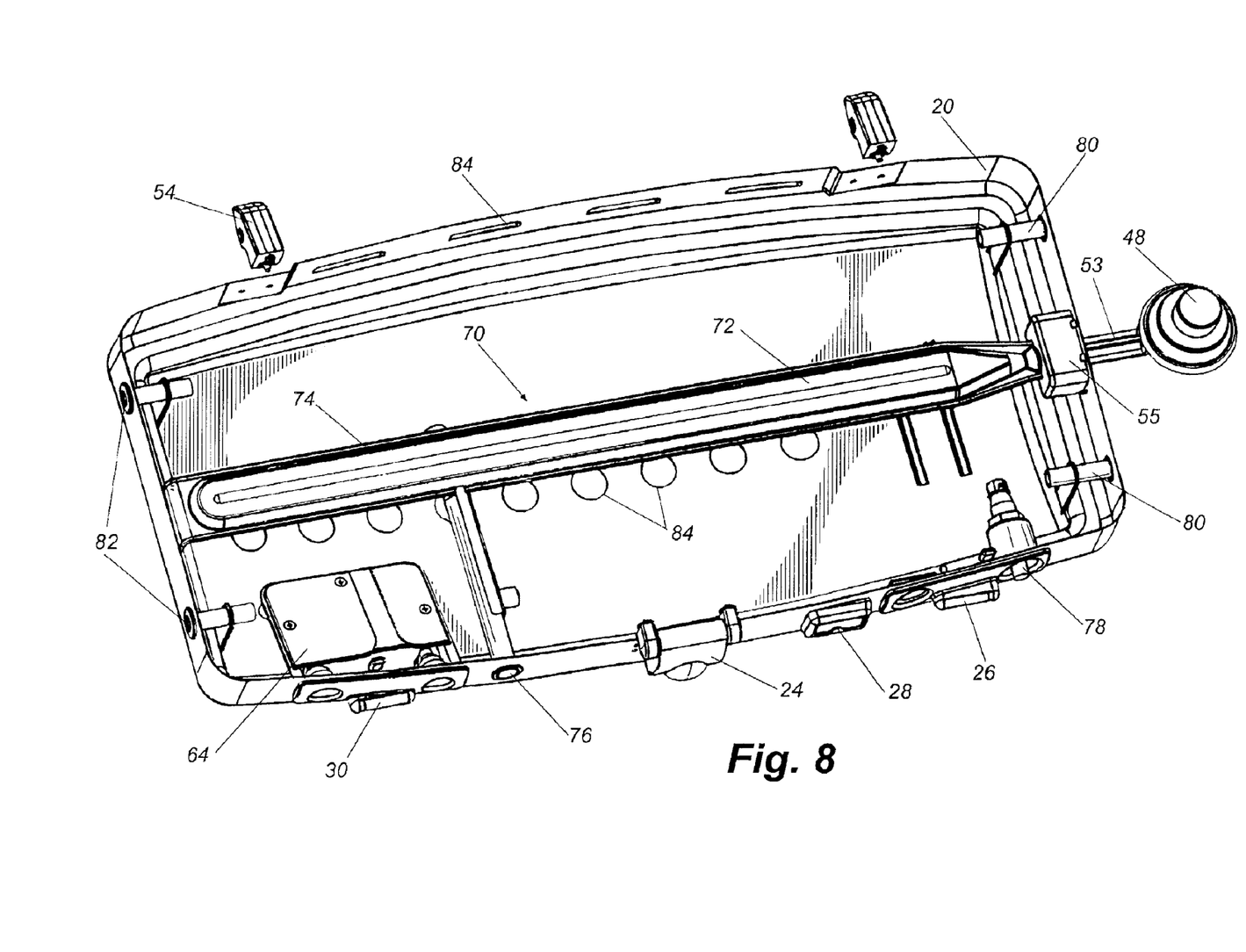
FIG. 8 is a perspective top view of an inner portion of the grill apparatus illustrated in FIG. 1.

A preferred gas burner assembly 70 is illustrated in FIG. 8. The gas burner assembly 70 generally comprises a gas burner 72 with a burner shield 74 disposed therebelow and extending the length of the firebox 20. Alternate embodiments can include a shield which substantially surrounds the burner or an embodiment in which the shield is omitted, the burner still being enclosed by the cooking surface and the firebox. The quick-connect valve 48, arranged and configured to receive a fuel source 46, 46' (FIG. 2), is in connection with the gas burner 72 and extends therefrom and outwardly from the firebox 20. The quick-connect valve 48 preferably includes a venturi 53 extending between the quck-connect valve 48 and the gas burner 72. The venturi 53 can either be fixed to the firebox 20 or be releasably fixed thereto with a spring clip, or the like. The venturi 53 is preferably connected to the gas burner 72 at a venturi guard 55. The venturi guard 55 can be disposed either internal to the firebox 20 (as shown) or external to the firebox 20. The gas burner assembly 70 preferably includes a flash tube 76 extending therefrom and providing an outlet to the exterior of the grill 12 for safe release of excess fuel, which may occur during ignition of the gas burner 72. It should be understood that although the flash tube 76 is illustrated as extending from the gas burner 72 toward a front face of the firebox 20, the flash tube 76 can extend in any direction from the gas burner 72 towards the outside environment surrounding the firebox 20. The gas burner assembly 70 preferably includes an automatic igniter 78 whereby a spark can be created to ignite fuel supplied to the gas burner 72. It is preferable that the automatic igniter 78 extends outside the grill 12 and is accessible to a user. It is further preferred that the automatic igniter 78 is substantially inset into an outer surface of the grill 12 keeping it sheltered from weather conditions.

An internal grease trap 64 can also be disposed within the firebox 20. The preferred internal grease trap 64 is arranged and configured to receive juices and grease released from cooking food and channeled along the cooking surface 56 to the drainage aperture 60 disposed therein. The internal grease trap 64 can further comprise a grease level indicator 30 visible from the exterior of the grill 12 when the hood 22 is seated on the firebox 20, thereby readily indicating to a user the level of fluid contained in the internal grease trap 64.

It is further preferable that the firebox 20 includes support members 80 disposed therein. As illustrated, the preferred support members 80 can be at least a partially hollow tube-shaped member having a receiving end 82 disposed substantially flush to an outward surface of the firebox 20. The receiving end 82 of each preferred support member 80 is preferably arranged and configured to releasably receive a prong 51 extending from the side shelf 18 for mounting the side shelf 18 on the exterior of the grill 12. The cooking surface 56 can be placed upon and supported by an inwardly extending elongated portion of each of the support members 80, thereby fully enclosing the gas burner assembly and internal grease trap 64.

While enclosure of the gas burner assembly 70 prevents flame flare-up from juices and grease released from cooking food dripping onto the gas burner 72, air must be introduced to the cavity where the gas burner assembly 70 is located to facilitate combustion. As such, the firebox 20 preferably includes air ventilation apertures 84 disposed therein. Although the present disclosure illustrates the air ventilation apertures 84 as comprising holes and slits disposed along a bottom face and rear face of the firebox 20, respectively, it should be understood that any configuration allowing air flow into the cavity where the gas burner assembly 70 is located (such as apertures located elsewhere in the firebox 20 or cooking surface 56) may be used to achieve the same result.

For ease of use, it is preferable that the grill 12 includes a temperature level indicator 28 and a grill level indicator 26 disposed thereon and visible from the outside of the grill 12 when the hood 22 is seated on the firebox 20. The temperature level indicator 28 can be read by a user to determine the temperature inside the grill 12. The grill level indicator can be read by a user to determine when the grill apparatus 10 is positioned appropriately for cooking to facilitate drainage of the juices and grease from the cooking surface 56 to the external grease trap 62 or, alternatively, the internal grease trap 64. The grill level indicator 26 can comprise a spirit level, commonly referred to as a "carpenter's level" or "bubble level," or the like. The cooking surface 56 is, as pointed out previously, at a compound angle relative to the plane of the firebox 20, slanting forward and to one side to place the grease drainage holes 60 at the low point of the cooking surface. Thus, when the apparatus is leveled, as indicated by the level indicator 26, the cooking surface is at an angle thereto.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A portable grill apparatus comprising:
    a grill having a hood and a firebox;
    a burner assembly being disposed in said firebox, said burner assembly being capable of heating an interior portion of said grill;
    a frame being arranged and configured to substantially correspond to said firebox and to receive and support said grill;
    an retractable leg assembly extending from said frame;
    a fuel connector in communication with said gas burner and extending outwardly from said grill, through a wall of said firebox, an outwardly extending portion of said fuel connector including a valve for controlling the amount of fuel delivered to the burner assembly; and
    a side shelf extending outwardly from said firebox, said side shelf having a substantially planar surface, the planar surface having a thickness and an opening configured to access the valve, the side shelf having a pair of prongs extending therefrom, said prongs being arranged and configured to be releasably received by support members which are disposed within the firebox.

2. The apparatus of claim 1, wherein said opening comprises a recess disposed in an edge of said side shelf.

3. The apparatus of claim 1, wherein said valve extends at least partially through said opening.

* * * * *